United States Patent
Schwarz et al.

(10) Patent No.: US 7,197,318 B2
(45) Date of Patent: Mar. 27, 2007

(54) METHOD AND NETWORK ELEMENT FOR CONTROLLING HANDOVER

(75) Inventors: Uwe Schwarz, Veikkola (FI); Harri Holma, Helsinki (FI); Karl Tigerstedt, Espoo (FI); Achim Wacker, Espoo (FI); Atte Artamo, Helsinki (FI); Kai Heikkinen, Helsinki (FI)

(73) Assignee: Nokia Corporation, Espoo (FI)

( * ) Notice: Subject to any disclaimer, the term of this patent is extended or adjusted under 35 U.S.C. 154(b) by 141 days.

(21) Appl. No.: 10/475,825

(22) PCT Filed: Apr. 26, 2001

(86) PCT No.: PCT/EP01/04744

§ 371 (c)(1),
(2), (4) Date: Oct. 24, 2003

(87) PCT Pub. No.: WO02/089514

PCT Pub. Date: Nov. 7, 2002

(65) Prior Publication Data

US 2004/0121777 A1    Jun. 24, 2004

(51) Int. Cl.
*H04Q 7/20* (2006.01)
*H03C 1/62* (2006.01)
*H04B 7/00* (2006.01)
*H04M 7/00* (2006.01)

(52) U.S. Cl. .......... 455/453; 455/436; 455/435.2; 455/448; 455/525; 455/115.3; 370/329

(58) Field of Classification Search .......... 455/436, 455/453, 452.1, 435.2, 448, 525, 115.3; 370/329
See application file for complete search history.

(56) References Cited

U.S. PATENT DOCUMENTS 4,670,899 A * 6/1987 Brody et al. .......... 455/453

(Continued)

FOREIGN PATENT DOCUMENTS

GB    2 313 258 A    11/1997

(Continued)

OTHER PUBLICATIONS

"Multimedia Services Management in Next Generation Mobile Networks", Iera et al, 1995 Fourth IEEE International Conference on Universal Personal Communications Record. Gateway to the 21st Century, Tokyo, Nov. 6-10, 1995, vol. CONF. 4, Nov. 6, 1995, pp. 687-691, XP000690040.

(Continued)

*Primary Examiner*—William Trost
*Assistant Examiner*—Ariel Balaoing
(74) *Attorney, Agent, or Firm*—Squire, Sanders & Dempsey L.L.P.

(57) ABSTRACT

The present invention relates to a method and apparatus for controlling a connection transfer in a cellular network having at least two systems, such as a GSM system and a WCDMA system. Based on a load determination, a service-based inter-system or inter-frequency handover of the connection to another system or to another carrier of the same system is initiated if the determined is below a threshold and service priorities are indicating it. If it exceeds the threshold, an additional load-based inter-system or inter-frequency handover can be initiated. If the load of the target cell is not known, a load estimation based on a learning process can be used to derive a probability of success of an interfrequency or inter-system handover, which may be used for deciding on the initiation of the inter-system handover. The learning process may be performed by evaluating preceding interfrequency or inter-system handovers to the target cell or preceding interfrequency or inter-system handovers from the target cell. Thereby, users can be shared between different radio access technologies or systems or between different carriers of one system to thereby improve network capacity and quality of service for both systems and carriers. Furthermore, unnecessary inter-system handovers can be prevented in case the load of the target cell of the other system is not known.

23 Claims, 4 Drawing Sheets

U.S. PATENT DOCUMENTS

| | | | |
|---|---|---|---|
| 5,907,807 A * | 5/1999 | Chavez et al. | 455/436 |
| 6,041,235 A * | 3/2000 | Aalto | 455/437 |
| 6,141,565 A * | 10/2000 | Feuerstein et al. | 455/560 |
| 6,185,422 B1 | 2/2001 | Mattila | 455/434 |
| 6,275,703 B1 * | 8/2001 | Kalev | 455/436 |
| 6,574,474 B1 * | 6/2003 | Nielsen | 455/436 |
| 6,611,506 B1 * | 8/2003 | Huang et al. | 370/329 |
| 2001/0022782 A1 * | 9/2001 | Steudle | 370/335 |
| 2002/0019231 A1 * | 2/2002 | Palenius et al. | 455/437 |

FOREIGN PATENT DOCUMENTS

| | | |
|---|---|---|
| WO | WO 94/05130 | 3/1994 |
| WO | WO 98/25429 | 6/1998 |
| WO | WO 00/45613 | 8/2000 |
| WO | WO 00/65852 | 11/2000 |
| WO | WO 00/65864 | 11/2000 |
| WO | WO 00/74417 | 12/2000 |

OTHER PUBLICATIONS

"Transport and Control Issues in Multimedia Wireless Networks", Iera et al, Wireless Networks, ACM, US, vol. 2, No. 3, Aug. 1, 1996, pp. 249-261, XP000625343.

* cited by examiner

METHOD AND NETWORK ELEMENT FOR CONTROLLING HANDOVER

FIELD OF THE INVENTION

The present invention relates to a method and network element for controlling a connection transfer in a cellular network having at least two carriers or at least two systems, such as a 3rd, generation mobile telecommunication network comprising a WCDMA (Wideband Code Division Multiple Access) system and a GSM (Global System for Mobile Communication) in or between which a user can be handed over.

BACKGROUND OF THE INVENTION

When deploying 3rd generation mobile communication technology, different radio access technology systems such as GSM and WCDMA will be available at the same time. From the viewpoint of a multisystem capable mobile station or terminal, both systems can be accessed. However, the network resources are managed by different system networks.

In general, the transfer of a user's connection from one radio channel to another radio channel in the same or a different radio cell of the same or a different cellular network is called handover. Each of the network systems may decide on its own about an intersystem handover (IS-HO) when the mobile is in an active mode. Such an IS-HO is a handover of a connection from a radio channel of the one system, e.g. the WCDMA system, to a radio channel of another system, e.g. the GSM system. One of the key requirements for a successful IS-HO is enough free capacity in the target cell. However, no appropriate signaling for load information exchange might be provided among the network elements initiating an IS-HO. If the need for a handover is detected in one of the systems due to a high network load, an IS-HO will be tried without exact load information about the target cell. This leads to a risk of failure or getting the mobile immediately back due to a corresponding high load situation in the other system (ping-pong effect).

Additionally, in the case of multivendor networks, less information exchange is guaranteed, as e.g. one vendor might group an IS-HO differently into the predefined classes for handover reasons than another vendor. Hence, the different system networks must be able to provide an IS-HO function without being directly informed about the load in the respective other system or systems. However, without information about the load of a target cell, unnecessary IS-HOs might be initiated possibly including compressed mode measurements of mobile terminals for IS-HO from the WCDMA system to the GSM system with additional network capacity consumption, signaling for preparing an IS-HO, and additional processing capacity required in different network elements. This leads to a waste of available radio resources if the load in the target cell does not permit IS-HOs. In addition, IS-HOs between highly loaded cells result in a possible QoS (Quality of Service) deterioration for the connected mobile terminal due to the ping-pong effect and additional and unnecessary risk of loosing the connection.

A $3^{rd}$ generation's WCDMA system could be operated in principle with a single carrier only. However in the WCMDA system, more than one carrier, may be used. Therefore, handover strategies and algorithms are needed to direct the users in the most efficient way between those carriers. Thus, whenever the WCDMA is not able to serve a user due to an overload in one carrier of the WCDMA system, this user may be handed over to either another carrier in the WCDMA system or to the GSM system. A handover within WCDMA between different carriers is called inter-frequency handover (IF-HO). Such an IF-HO requires the possibility for the mobile terminal to carry out a cell search on a carrier frequency different from the current one, without effecting the ordinary dataflow. The WCDMA system supports inter-frequency cell search in two different ways, a dual-receiver approach and a slotted-downlink-transmission approach. In the dual-receiver approach, a receiver diversity is provided in the mobile terminal, wherein one of the receiver branches can be fully allocated or temporarily reallocated from diversity reception and instead carry out reception on a different carrier. In the case of a slotted-downlink-transmission, a single-receiver mobile terminal is arranged to carry out measurements on other frequencies without effecting the ordinary dataflow. In the slotted mode, the information normally transmitted during a signal frame is compressed in time, either by code puncturing or by reducing the spreading factor e.g. by a factor two. In this way, a time period of e.g. half of the frame period is created during which the receiver of the mobile terminal is idle and can be used for interfrequency measurements. Once initiated such slotted frames may occur periodically, wherein the rate of slotted frames is variable and depends on the environment and the measurement requirements.

The WCDMA technology can offer services which cannot be supported by current GSM systems. Therefore, it could be desirable that users which have a service that can be offered by the GSM system as well, should be handed over to it in order to free capacity for such services that can only be served by the WCDMA system. Moreover, if a mobile terminal is using a service in the GSM system and wants to establish a service which cannot be provided in the GSM system, it should be handed over to the WCDMA system.

Therefore, handovers triggered by certain service and/or load criteria should be provided from the GSM system to the WCDMA system and within the carriers of the WCDMA system to thereby provide a function for sharing users according to current network loads and used services.

SUMMARY OF THE INVENTION

It is therefore an object of the present invention to provide a method and apparatus for controlling a connection transfer, by means of which resource utilization in the cellular network can be improved.

This objective is achieved by a method for controlling a connection transfer in a cellular network having at least two carriers or at least two systems, the method comprising the steps of:

determining the load of one of the at least two carriers or one of the at least two systems, used by a connection;

initiating a service-based inter-system or inter-frequency handover of the connection to another one of the at least two systems or another one of the at least two carriers, respectively, based on a service priority, if the determined load is below a predetermined threshold; and initiating a load-based inter-system or inter-frequency handover of the connection to another one of the at least two systems or another one of the at least two carriers, respectively, if the determined load exceeds the predetermined threshold.

Furthermore, the above object is achieved by a network element for controlling a connection transfer in a cellular communication network having at least two carriers or at least two systems, the network element comprising:

determining means for determining the load of one of the at least two carriers or one of the at least two systems, used by the connection; and handover control means for initiating a service-based inter-system or inter-frequency handover of the connection to another one of the at least two systems or another one of the at least two carriers, respectively, based on a service priority, if the determined load is below a predetermined threshold, and for initiating a load-based inter-system or inter-frequency handover of the connection to another one of the at least two systems or another one of the at least two carriers, respectively, if the determined load exceeds the predetermined threshold.

Accordingly, users can be shared between the already existing radio access technology of the GSM system and the new radio access technology of the WCDMA system, as well as between different carriers of the new radio access technology of the WCDMA system to thereby improved networks capacity and quality of service for both systems, because users can be handed over to another carrier, when the load in the original carrier exceeds the predetermined threshold and a desired QoS cannot be maintained in the original carrier. Moreover, in case of the service-based handover, the user can be connected to a carrier within the WCDMA system which is served best and which causes minimal interference to other users. Furthermore, users can be handed over from one system to the other and vice versa, when one system is overloaded or cannot offer or maintain a desired service or QoS. Due to the provision of the service-based handover function, one system can be freed from a service which can be offered also by the other system, such that resources of the first network can be used for services which can be offered only by this network. Thereby, service probability can be increased. In addition, the provision of the service-based and load-based inter-system and inter-frequency handover facilitates a layered network layout of the systems, e.g. macro- and microsystems.

In general, the achieved balance of the load in both systems prevents blocking of new access attempts by reducing the load at an earlier point in time. Inter-frequency and inter-system handovers lead to an improved situation when a lack of resources in one system or carrier occurs. It also improves a situation where calls would be rejected due to an unacceptable quality. Furthermore, a situation can be mitigated where too much interference from adjacent channels of the same or neighbouring systems is faced. Thus, higher network capacities and QoS are achieved due to trunking gain and more efficient use of the resources. In zones where a new radio access technology has no coverage in the beginning, the other system can take over the service. In areas, where layered networks on two frequencies are overlapping, the traffic can be shared and users can be connected to a preferred layer, thereby reducing interference and handover rate. Dropped or blocked calls can be reduced in one system or layer, and a service which cannot be offered in one carrier or system may be taken over by the other carrier.

The service-based inter-system or inter-frequency handover may be allowed if the load of a target cell does not exceed the predetermined threshold. Thereby, it can be assured that the overall load level in the different carriers or system will be more equalized or balanced after each handover operation.

Different thresholds may be used for the inter-system and inter-frequency handovers. Thereby, different load criteria can be applied to the handovers between different carriers and between different systems, such that flexibility can be increased. In particular, the IF-HO threshold may correspond to a load smaller than the load of the IS-HO threshold. In particular, the IF-HO threshold may correspond to a load of 50% of the maximum allowed load and the IS-HO threshold may correspond to a load of 80% of the maximum load. The handover initiation can be performed after the expiry of predetermined time periods which may be measured by one or a plurality of respective timers, e.g. to prevent ping-pong effects.

Additionally, the above object is achieved by a method for controlling a connection transfer in a cellular network having at least two systems, said method comprising the steps of:

determining the load of one of the at least two systems, used by a connection;

estimating a probability of success of an inter-system handover of the connection to another one of the at least two systems, based on a learning process; and deciding on the inter-system handover based on the estimated probability of success.

Furthermore, the above object is achieved by a network element for controlling a connection transfer in a cellular network having at least two systems, the network element comprising:

determining means for determining the load of one of the at least two systems, used by a connection; and handover control means for estimating a probability of success of an inter-system handover of the connection to another one of the at least two systems, based on a learning process, and for deciding on the inter-system handover based on the estimated probability of success.

The learning process may comprise evaluating the history of successful and/or unsuccessful inter-system handovers to a target cell. In addition thereto, or as an alternative, the learning process may comprise evaluating an incoming inter-system handover message from a target cell. In this case, the evaluation may be based on a reason message in the incoming inter-system handover message, or on service priority settings in the target cell.

Accordingly, unnecessary handovers can be avoided by the learning process in case the load of the target cell is not known. This reduces the risk of loosing a mobile connection, avoids QoS deterioration and avoids additional unnecessary loading of the network. Thus, networks capacity can be saved and quality degradation avoided.

The decision step may lead to one of the results of initiating the inter-system handover, postponing the inter-system handover, and canceling the inter-system handover. Thus, a flexible response is provided in dependence on the estimated probability of success of the handover.

Furthermore, timer means may be provided for counting a delay time set by the handover control means based on the decision result. Thereby, the learning period can be adjusted based on the delay time set in the timer means.

The network element may be a base station controller or a radio network controller.

BRIEF DESCRIPTION OF THE DRAWINGS

In the following, the present invention will be described in greater detail based on a preferred embodiment with reference to the accompanying drawings, in which.

DETAILED DESCRIPTION OF THE PREFERRED EMBODIMENT

The preferred embodiment will now be described based on a connection transfer functionality in a cellular network environment comprising a GSM system and a WCDMA system.

Figure 1:
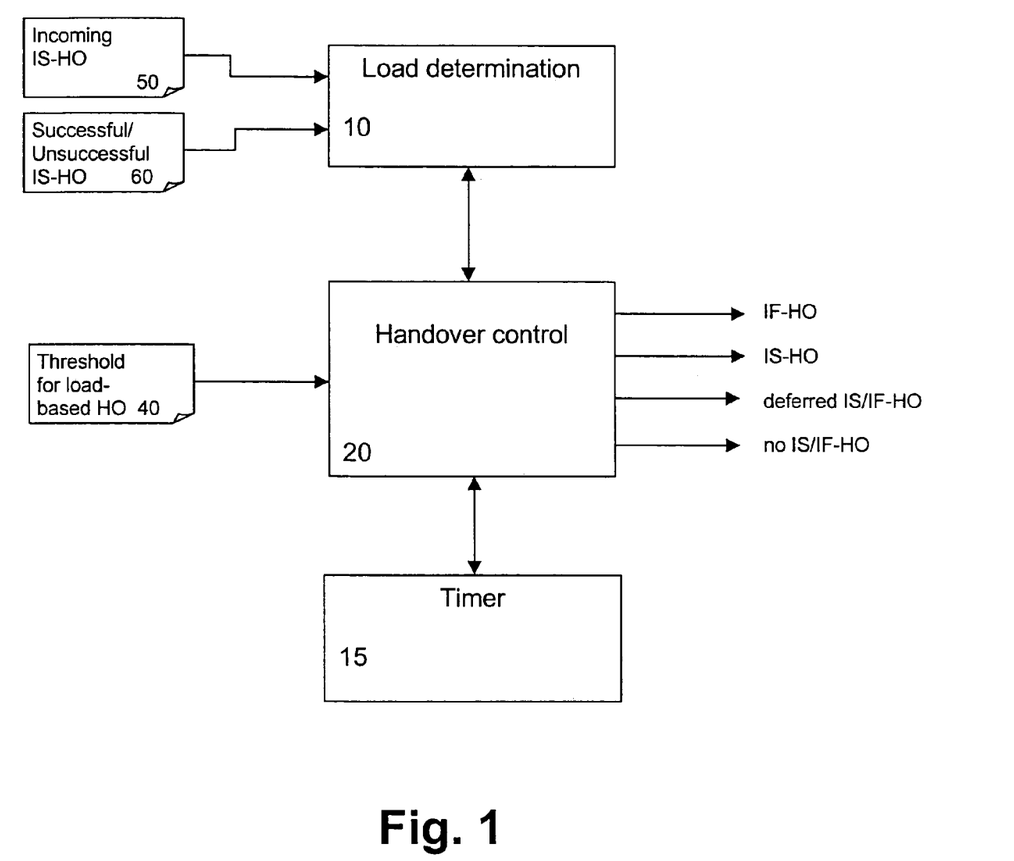
FIG. 1 shows a schematic block diagram of a connection transfer functionality according to the preferred embodiment.

FIG. 1 shows a schematic block diagram of a connection transfer or handover functionality provided in a network element such as a base station controller (BSC) of the GSM system or the radio network controller (RNC) of a WCDMA system.

According to FIG. 1, a handover control function or unit 20 is provided which generates a signaling for an IF-HO or IS-HO based on an information obtained from a load determination function or unit 10 and specific other parameters required for a decision on the initiation of a IF-HO or a IS-HO. Such parameters may comprise a predetermined threshold 40 for load-based handovers, which may be stored in a corresponding memory or register. The threshold 40 may be set by an operator or by the handover control unit 20 itself.

The load determination unit 10 is arranged to determine the load of the originating cell and/or the target cell based on a corresponding network information or conventional determination procedures. E.g., the determination result may simply be either "high load" or "not high load". Furthermore, the load determination unit 10 may be arranged to estimate a target cell load based on a learning process exploiting different sources of information such as an information 50 derived from an incoming IS-HO or a history information 60 about successful and/or unsuccessful IS-HOs. The information 50 derived from the incoming IS-HO may be a reason message or information contained in the incoming IS-HO or a combination of the incoming IS-HO with the service priority settings in the target cell.

Thus, the load determination unit 10 provides a load information about the target cell and the originating cell to the handover control unit 20, wherein the load information about the target cell may be a determined load, or a load estimation based on a learning process if the load of the target cell is not available from the network due to a desired SH-O to another system.

Furthermore, a timer function 15 may be provided for counting a time period before the initiation of any IF-HO or IS-HO decided by the handover control unit 20. The timer function 15 may be implemented as a wait timer to provide a delay time before handover initiation so as to prevent unnecessary handovers as long as the load of the target cell is likely to remain high.

As indicated in FIG. 1, the handover control unit(20 may decide to perform a direct IF-HO to another carrier or an IS-HO to another network system. Furthermore, the handover control unit 20 may decide to defer the IF- or IS-HO, wherein the delay period may be determined by the timer function 15. Additionally, the handover control unit 20 may decide to cancel the initiation of a IF- or IS-HO based on the determined or estimated load obtained from the load determination unit 10.

It is noted that the functional units shown in FIG. 1 may be implemented as concrete hardware elements or as procedures or routines of a control program controlling a control function (e.g. processor unit) of the respective network element which includes the connection transfer functionality.

Figure 2:
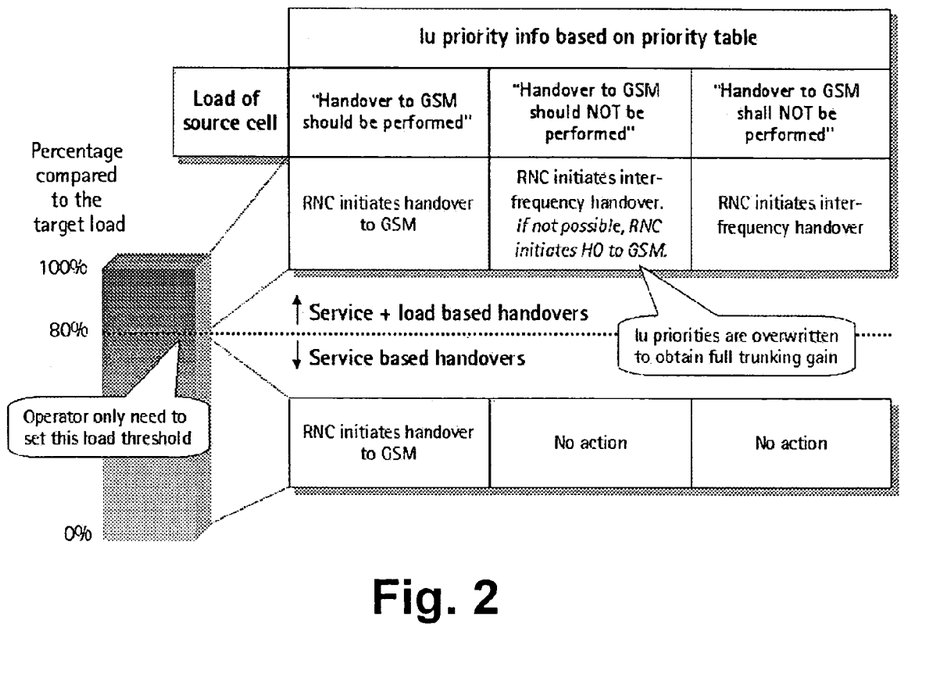
FIG. 2 shows a diagram indicating load levels and possible handover scenarios based on a priority setting for service-based handovers.

FIG. 2 shows a diagram indicating load levels of an originating cell from which a connection is to be handed over, and a service priority setting for service-based handovers. As can be gathered from FIG. 2, only service-based handovers are initiated below a predetermined threshold of e.g. 80% of a target load, which can be set e.g. by the network operator. Above this threshold, service-based and load-based handovers can be initiated. The priority setting may be obtained from a priority information communicated via a protocol interface, e.g. the Iu interface, based on a priority table as indicated in FIG. 2.

Without IF- and IS-HO an optimization of the scarcely available and expensive network resources is not possible. A user cannot establish a connection or use a connection if the service cannot be offered by the current network or layer at all or not anymore with the required QoS. This may be the case if the current network or layer is going to be overloaded. Furthermore, mobile terminals can be connected to a network or to a layer of a network, where the transmission is not optimized, such that the mobile terminal or base station are causing and/or receiving too much interference, which leads to a degraded QoS.

Therefore, the threshold 40 for service-based handover and load-based handover is set in the connection transfer functionality so as to provide an improved handover control function based on the actual cell load determined by the load determination unit 10. Below threshold 40, the handover control unit 20 initiates a service-based IS-HO to another network system or radio access technology. The service-based handover is an IS-HO which is performed if the respective service is also offered in the other system to thereby free capacity of the originating carrier or system. However, if the load of the target cell is estimated to be high, the initiation of the service-based IS-HO is cancelled.

When the threshold 40 for load-based handovers is determined to be exceeded, load-based as well as service-based handovers are initiated by the handover control unit 20, wherein an IS-HO or IF-HO to the target cell is cancelled, if the target cell load is estimated to be high. The load-based handover is any handover,.by which QoS is desired to be increased or network capacities are desired to be freed.

According to the example priority setting given in FIG. 2, which is related to a handover control function in an RNC, only a service-based IS-HO to GSM is initiated if the load level is below the threshold 40, e.g. an 80% load level, and if the priority information indicates that a handover to GSM should be performed. However, if the load level is above the threshold 40, an IF-HO is initiated if the priority information indicates that the handover to GSM should not be performed or that the handover to GSM shall not be performed. Additionally, if the priority information indicates that the handover to GSM should not be performed and an IF-HO is not possible, the RNC may initiate an IS-HO to GSM to thereby obtain full trunking gain. It is obvious that other suitable or desired priority settings may be implemented.

As already mentioned, the initiated handover may be an IF-HO or an IS-HO. In the case of an IF-HO, both sides, i.e. originating cell and target cell, correspond to the same radio access technology, e.g. the WCDMA system, but different carriers. The initiation of IF-HO or IS-HO may be delayed by a time period determined by the timer function 15. In particular, different thresholds 40 and timer periods could be used for the IS-HO and the IF-HO. Thereby, a flexible connection transfer or handover functionality can be implemented. Moreover, an optional second threshold (lower than the threshold 40), e.g. 50% of the target load, may be provided, below which no handovers are initiated.

As an example, the load-based handover may be performed for speech calls and HSCSD (High Speed Circuit Switched Data) GSM calls.

In the following, the learning based load estimation function provided by the load determination unit 10 is described in greater detail. In particular, this function may be implemented as a separate or sole function in a network element. Alternatively, this function may be combined with the above described handover control function, to be used in cases where the target load cannot be determined.

When the load determination unit 10 cannot derive any information about the load of the other system i.e. target system for the IS-HO, the network element of the source or originating system may still learn about the target cell load by exploiting different sources of information, e.g. the history of successful and/or unsuccessful IS-HOs to the target cell, as indicated by the information 60, or the information 50 about an incoming IS-HO from the target cell, which may be derived from a reason message provided in the incoming IS-HO or, in case such a reason message is not included, a combination of the incoming IS-HO with the service priority settings in the target cell. Thereby, the probability of a success for a new IS-HO can be estimated, and the handover control unit 20 may decide on the basis of this load estimation, whether the handover procedure is initiated, or postponed by means of the timer function 15, or completely cancelled. Thereby, network capacity can be saved and good QoS can be maintained.

In this respect, it is to be noted that the detection of a need for an IF- or IS-HO due to high load in the originating cell, e.g. when a mobile terminal moves to a fully loaded cell, and the subsequent cancellation of the IS-HO due to the learning process about a high load in the target cell of the other system might result in a dropping of the call. However, this result is advantageous, since a try of an initiation of an IS-HO to the loaded cell of the other system with all its costs and signalings finally leads to the same result, namely a dropped call. Thus, costs and network resources can be saved.

Figure 3:
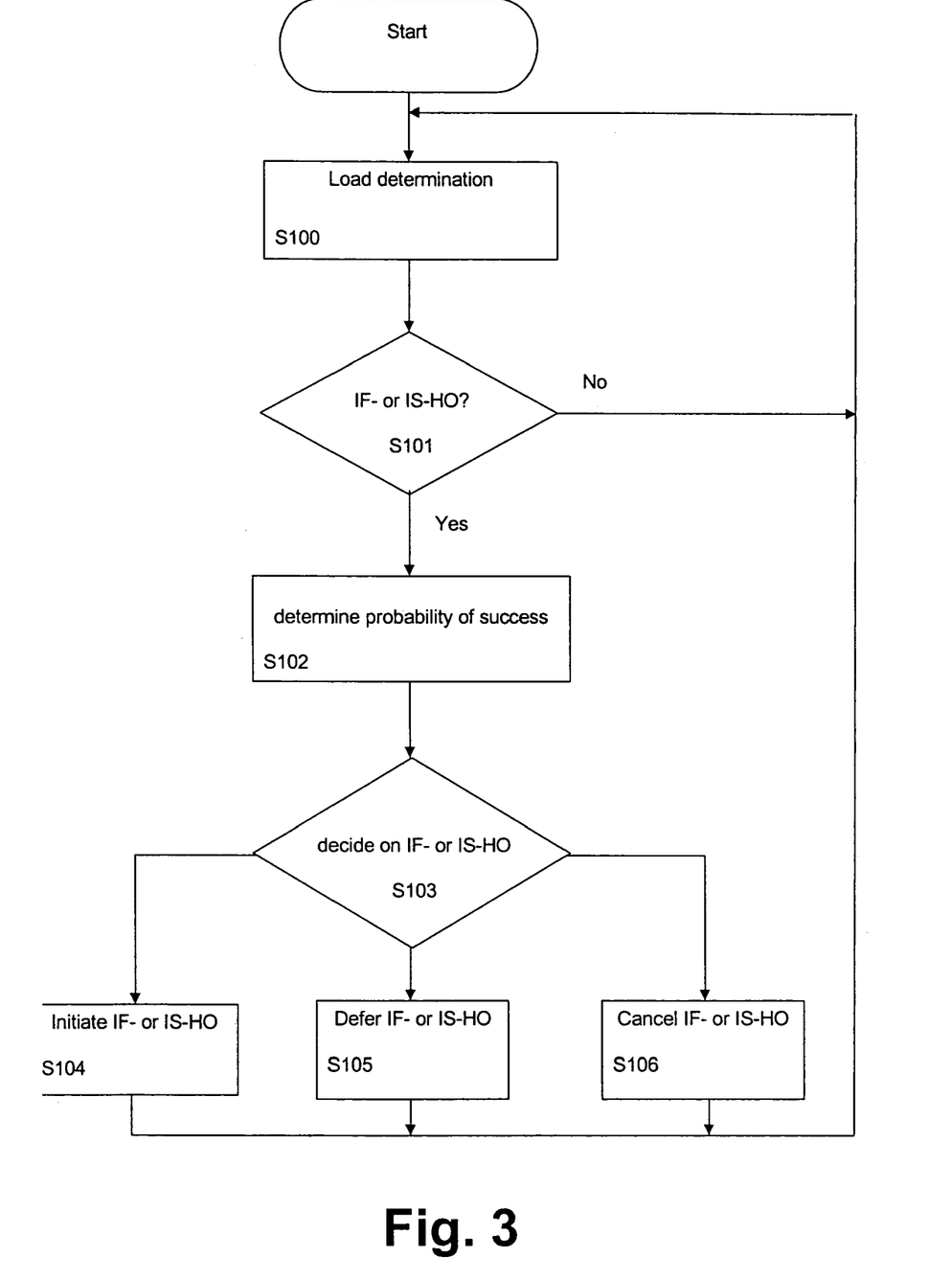
FIG. 3 shows a flow diagram of a connection transfer method according to the preferred embodiment.

FIG. 3 shows a general flow diagram of a connection transfer or handover function based on a target cell load estimation or determination function. In step S100, the load determination unit 10 determines the load of the originating cell based on a corresponding load information available in the network element or the network. Then, a decision and an initiation of an IF- or IS-HO is made by the handover control unit 20 based on the determined load and e.g. respective threshold levels. If the handover control unit 20 determines in step S101 that no IF- or IS-HO is to be initiated, the flow returns to step S100 to obtain a new actual load value.

On the other hand, if it is determined in step S101 that an IF- or IS-HO is to be initiated, the load determination unit 10 is controlled by the handover control unit 20 to determine a probability of success by determining or estimating the load of the target cell.

In case of an IS-HO to another system, the learning procedure can be used. The learning procedure may be based on a comparison of a number of successful and unsuccessful IS-HOs to the concerned target cell within a predetermined preceding time period. This information may be stored in a memory or register and is indicated by the reference number 60 in FIG. 1. As an alternative, one or a plurality of former incoming IS-HOs from the target cell may be evaluated with respect to their reasonings or a combination with the service priority settings in the target cell of the other system, if available. This information is indicated by the reference number 50 in FIG. 1. Based on this information obtained within a predetermined preceding time period, the load determination unit 10 provides a load estimate which may be a percentage of the maximum load or a number between zero and one to the handover control unit 20.

Using the load information, the handover control unit 20 decides on the initiation of the IF- or IS-HO. In particular, different suitable levels of the determined or estimated load may be used as a criterion for the decision. As shown in FIG. 3, the handover control unit may decide to defer a signaling for initiating a direct IF- or IS-HO in step S104. As an alternative, the handover control unit 20 may decide to control the timer function 15 so as to provide a delay time for deferring an IF- or IS-HO in step S105. As another alternative, the handover control unit 20 may decide to cancel the IF- or IS-HO due to the fact that the load in the target cell of the other system is too high (step S106). Thereby, unnecessary IF- or IS-HOs can be prevented or delayed as long as the load of the target cell is likely to remain high.

It is noted that the connection transfer function described with reference to FIG. 3 may as well include a priority function according to which e.g. an IF-HO has priority over an IS-HO, as indicated in FIG. 2.

Figure 4A:
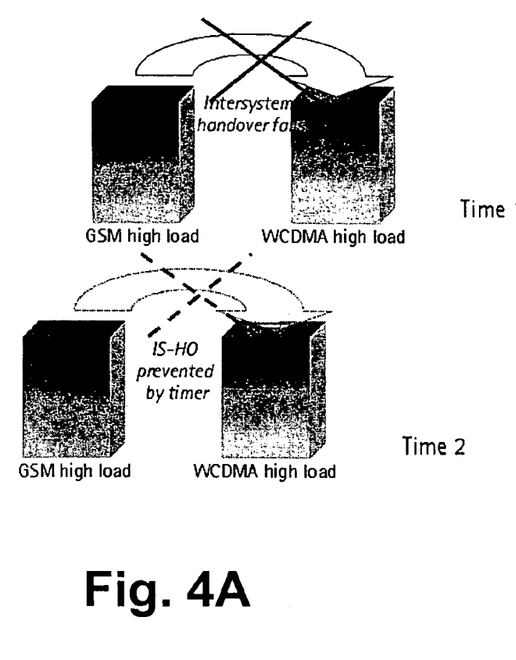
FIGS. 4A and 4B show example diagrams indicating learning processes for estimating a load level in a target cell.
Figure 4B:
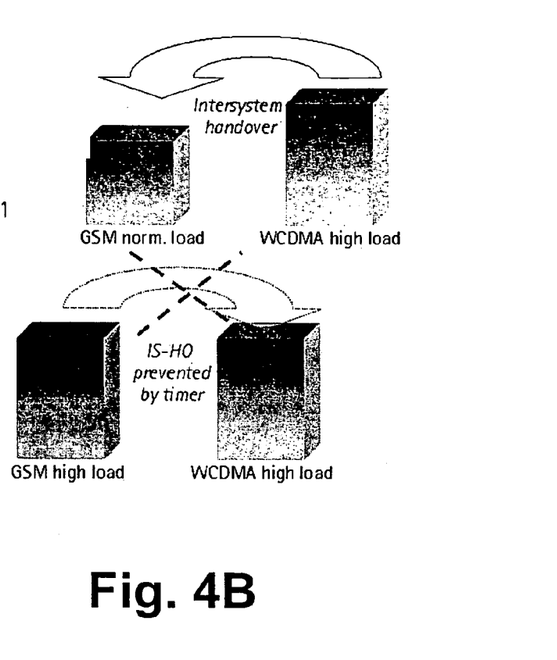

FIGS. 4A and 4B show diagrams illustrating how a network element (i.e. the load determination unit 10) of a GSM system is able to learn about the load situation in a target cell of a WCDMA system. In the upper part of the diagrams, a first preceding point in time (Time 1) is shown, and in the lower part of the diagrams a later point in time (Time 2) is shown. Preferably, several such events in the recent time are taken into account to estimate the load situation in the target cell.

In FIG. 4A, the load in the GSM originating cell and in the WCDMA target cell is high, such that the history of previous IS-HOs indicates that previous IS-HO to the respective WCDMA target cell failed. Therefore, the initiation of an actual IS-HO may be cancelled or at least delayed by a timer period until the probability of success has sufficiently increased.

FIG. 4B shows a case where the GSM originating cell load was normal in the former point in time (Time 1) and the WCDMA target cell load was high. Thus, an IS-HO from the target cell of the WCDMA has been received and registered in the corresponding information 50. Thus, the load determination unit 10 judges that the load of the target cell must be high and the probability of success low, and provides a corresponding load estimation information to the handover control unit 20 which correspondingly at least defers the IS-HO based on a selected timer period, when the load in the originating GSM cell is high.

Thus, the success of previous IS-HOs to the target cell or the receipt of previous IS-HOs from the target cell can be used for learning about the load of the target cell.

Figure 5A:
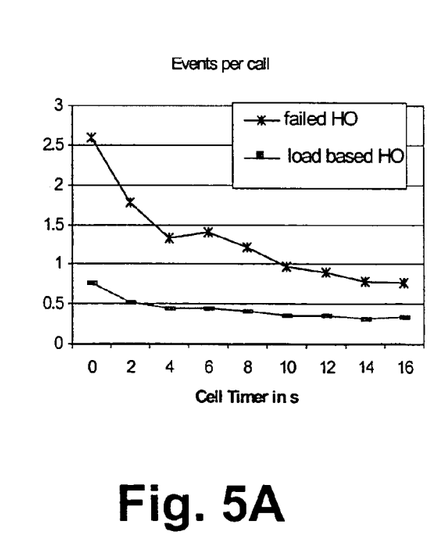
FIG. 5A shows a diagram indicating simulation results of failed and load-based handovers as a function of a selected timer period.

FIG. 5A shows a diagram of simulation results indicating the relationship between failed handovers or load-based handovers and a time period of a cell timer for deferring the initiation of IS-HOs. As can be gathered from FIG. 5A, the number of failed handovers can be reduced by increasing the time period of the cell timer, e.g. the timer function 15. In particular, "0 seconds" means basically that the network element is not learning or adapting to the other system, whereas "16 seconds" means that the network element learns and adapts to the other system. The time periods can also exceed the shown 16 seconds. With the learning algorithm, the handover failure rate can be reduced by 60%, e.g. from 2.6 to 0.8, such that 60% of the compressed mode (CM) measurements required for the IS-HO to the WCDMA system can be avoided.

Figure 5B:
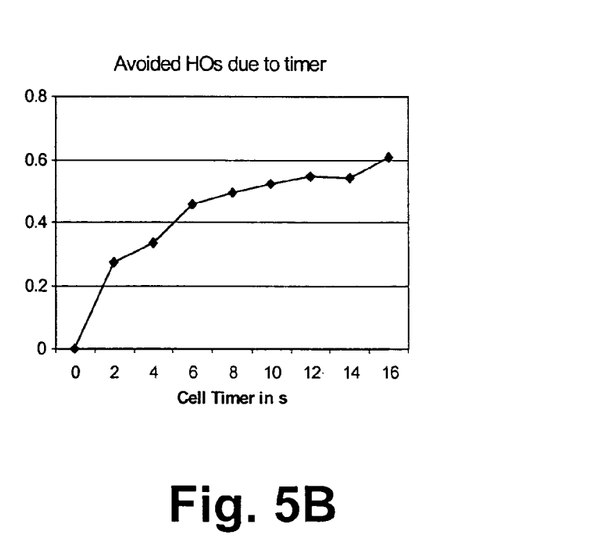
FIG. 5B shows a diagram indicating simulation results of avoided handovers due to the selected timer period.

FIG. 5B shows an indication of the ratio of avoided handovers per call due to the time period for the learning process, derived from the simulation results. As indicated in FIG. 5B, the ratio of 60% of avoided unnecessary handover initiations can be obtained by a learning time period of 16 seconds. Unnecessary CM measurements lead to increased costs for the connection itself and reduce the whole cell's performance. Thus, avoided unnecessary handovers are clearly beneficial.

It is noted that the present invention is not restricted to the above described preferred embodiment and can be used in any network environment where a connection can be transferred between carriers of a same system or between different systems. Moreover, any load estimation based on a learning procedure using information about preceding signalings can be provided. The present invention may thus vary within the scope of the attached claims.

The invention claimed is:

1. A method for controlling a connection transfer, said method comprising:
   controlling a connection transfer in a cellular network having at least two carriers or at least two systems, said controlling comprising:
      determining the load of one of said at least two carriers or one of at least two systems, used by a connection said determined load being the load of a source cell;
      performing a learning process for estimating the load of a target cell when said load of a target cell cannot be made available;
      estimating a probability of success of an inter-system or inter-frequency handover of said connection to another one of said at least two systems or another one of said at least two carriers on basis of the load estimated by said learning process;
      initiating a service-based inter-system or inter-frequency handover of said connection to another one of said at least two systems or another one of said at least two carriers, respectively, based on a service priority, if said determined load is below or above a predetermined threshold and if said load of a target cell does not exceed said predetermined threshold, said load of a target cell being determined or estimated; and
      initiating a load-based inter-system or inter-frequency handover of said connection to another one of said at least two systems or another one of said at least two carriers, respectively, if said determined load exceeds said predetermined threshold and if said load of a target cell does not exceed said predetermined threshold, said load of a target cell being determined or estimated.

2. A method according to claim 1, wherein said at least two carriers are Wideband Code Division Multiple Access carriers.

3. A method according to claim 1, further comprising using different thresholds for said inter-system or inter-frequency handovers.

4. A method according to claim 1, wherein said at least two systems comprise a Global System for Mobile Communications system and a Wideband Code Division Multiple Access system.

5. A method according to claim 1, further comprising performing said initiation step only after the expiry of predetermined time periods.

6. A method according to claim 1, wherein said predetermined threshold corresponds to a load of 80% of the maximum load.

7. A method according to claim 1, wherein said learning process comprises evaluating history of successful and/or unsuccessful inter-system handovers to said target cell.

8. A method according to claim 7, wherein said learning process comprises evaluating an incoming inter-system handover message from a target cell.

9. A method according to claim 8, wherein said evaluation is based on a reason message in said incoming inter-system handover message.

10. A network element, said network element comprising:
    a) determining means for determining a load of one of at least two carriers or one of at least two systems used by said connection, said determined load being a load of a source cell; and
    b) handover control means for
       performing a learning process for estimating the load of a target cell when said load of a target cell cannot be made available;
       estimating a probability of success of an inter-system or inter-frequency handover of said connection to another one of said at least two systems or another one of said at least two carriers on basis of the load estimated by said learning process;
       initiating a service-based inter-system or inter-frequency handover of said connection to another one of said at least two systems or another one of said at least two carriers, respectively, based on a service priority, if said determined load is below or above a predetermined threshold and if said load of a target cell does not exceed said predetermined threshold, said load of a target cell being determined or estimated, and
       initiating a load-based inter-system or inter-frequency handover of said connection to another one of said at least systems or another one of said at least two carriers, respectively, if said determined load exceeds said predetermined threshold and if said load of a target cell does not exceed said predetermined threshold, said load of a target cell being determined or estimated,
    wherein the network element controls a connection transfer in a cellular network having at least two carriers or at least two systems.

11. A network element according to claim 10, further comprising timer means for counting a time period which must have expired before said load-based or service-based inter-system or inter-frequency handovers are initiated.

12. A network element according to claim 10, wherein said at least two carriers are Wideband Code Division Multiple Access carriers.

13. A network element according to claim 10, wherein said at least two systems comprise a Global System for Mobile Communications system and a Wideband Code Division Multiple Access system.

14. A network element according to claim 10, wherein said predetermined threshold is set by an operator or said handover control means.

15. A network element according to claim 10, wherein said network element is a base station controller.

16. A network element according to claim 10, wherein said network element is a radio network controller.

17. A network element, said network element comprising:
a) determining unit configured to determine a load of one of at least two carriers or one of at least two systems used by said connection, said determined load being a load of a source cell; and
b) handover control unit configured to
perform a learning process for estimating the load of a target cell when said load of a target cell cannot be made available;
estimate a probability of success of an inter-system or inter-frequency handover of said connection to another one of said at least two systems or another one of said at least two carriers on basis of the load estimated by said learning process;
initiate a service-based inter-system or inter-frequency handover of said connection to another one of said at least two systems or another one of said at least two carriers, respectively, based on a service priority, if said determined load is below or above a predetermined threshold and if said load of a target cell does not exceed said predetermined threshold, said load of a target cell being determined or estimated, and
initiate a load-based inter-system or inter-frequency handover of said connection to another one of said at least systems or another one of said at least two carriers, respectively, if said determined load exceeds said predetermined threshold and if said load of a target cell does not exceed said predetermined threshold, said load of a target cell being determined or estimated,
wherein the network element controls a connection transfer in a cellular network having at least two carriers or at least two systems.

18. A network element according to claim 17, further comprising timer unit configured to count a time period which must have expired before said load-based or service-based inter-system or inter-frequency handovers are initiated.

19. A network element according to claim 17, wherein said at least two carriers are Wideband Code Division Multiple Access carriers.

20. A network element according to claim 17, wherein said at least two systems comprise a Global System for Mobile Communications system and a Wideband Code Division Multiple Access system.

21. A network element according to claim 17, wherein said predetermined threshold is set by an operator or said handover control means.

22. A network element according to claim 17, wherein said network element is a base station controller.

23. A network element according to claim 17, wherein said network element is a radio network controller.

* * * * *